United States Patent [19]

Montague

[11] Patent Number: 4,628,438

[45] Date of Patent: Dec. 9, 1986

[54] POWER CONVERTER APPARATUS AND METHOD EMPLOYING PLURAL BRANCHES

[75] Inventor: Herbert R. Montague, Binghamton, N.Y.

[73] Assignee: Control Concepts Corporation, Binghamton, N.Y.

[21] Appl. No.: 562,185

[22] Filed: Dec. 16, 1983

[51] Int. Cl.$^4$ .......................................... H02M 7/538
[52] U.S. Cl. ...................................... 363/134; 307/66; 363/37; 363/43; 363/89
[58] Field of Search ........................ 307/44, 46, 48, 66; 363/37, 43, 131, 89, 133, 134

[56] References Cited

U.S. PATENT DOCUMENTS

| | | | |
|---|---|---|---|
| 3,100,851 | 8/1963 | Ross et al. | 363/43 |
| 3,227,889 | 1/1966 | Paynter | 363/43 |
| 3,471,795 | 10/1969 | Schilling | 330/24 |
| 3,471,796 | 10/1969 | Wright | 330/30 |
| 3,539,902 | 11/1970 | Hickling | 363/43 |
| 3,577,092 | 5/1971 | Kubicz | 330/124 |
| 3,579,136 | 5/1971 | Machamer | 330/30 |
| 3,622,899 | 11/1971 | Eisenberg | 330/22 |
| 3,832,643 | 8/1974 | Van Heyningen | 330/15 |
| 3,858,119 | 12/1974 | Engelhardt | 330/15 |
| 3,946,301 | 3/1976 | Love | 363/56 |
| 4,160,216 | 7/1979 | Thornton | 330/267 |
| 4,410,935 | 10/1983 | Dang | 363/37 |
| 4,471,422 | 9/1984 | Hierholzer | 363/75 |
| 4,476,520 | 10/1984 | Gallemore | 363/43 |

FOREIGN PATENT DOCUMENTS 2344176 10/1977 France .

*Primary Examiner*—Patrick R. Salce
*Assistant Examiner*—Jeffrey Sterrett
*Attorney, Agent, or Firm*—Lowe, Price, LeBlanc, Becker & Shur

[57] ABSTRACT

An uninterrupted AC supply includes an AC to DC converter having several DC storage devices which maintain a constant DC voltage in the event of a failure of several cycles of the AC source. Each of the storage devices is connected to a separate branch circuit. Each branch circuit includes a transistor that is driven in a linear manner during a portion of a quarter cycle of an AC reference source, so that only one branch conducts current at a time. The DC voltage supplied to each branch and the conducting interval of each branch are such that equal energy dissipation occurs in each branch during each quarter cycle. To enable only one set of branches to be used for opposite polarity variations of the AC reference source, the current from all of the branches flows to a single node, then to opposite terminals of a center tapped transformer primary winding via a pair of switches. During first and second opposite polarity half cycles of the AC reference source, the first and second switches are respectively open and closed so that current flows in the transformer winding in opposite directions during the opposite polarity half cycles of the AC reference source.

For a sinusoidal source energy dissipation is equalized in each branch by selecting the phase angle, $\theta_k$, when branch circuit k changes from a conducting to a non-conducting state and the phase angle $\theta_{k-1}$ when branch circuit k begins to conduct such that $\sin\theta_k \cos\theta_{k-1} - \theta_k - \theta_{k-1}/2 - \frac{1}{4}(\sin2\theta_k + \sin2\theta_{k-1})$ is the same for each branch circuit.

5 Claims, 1 Drawing Figure

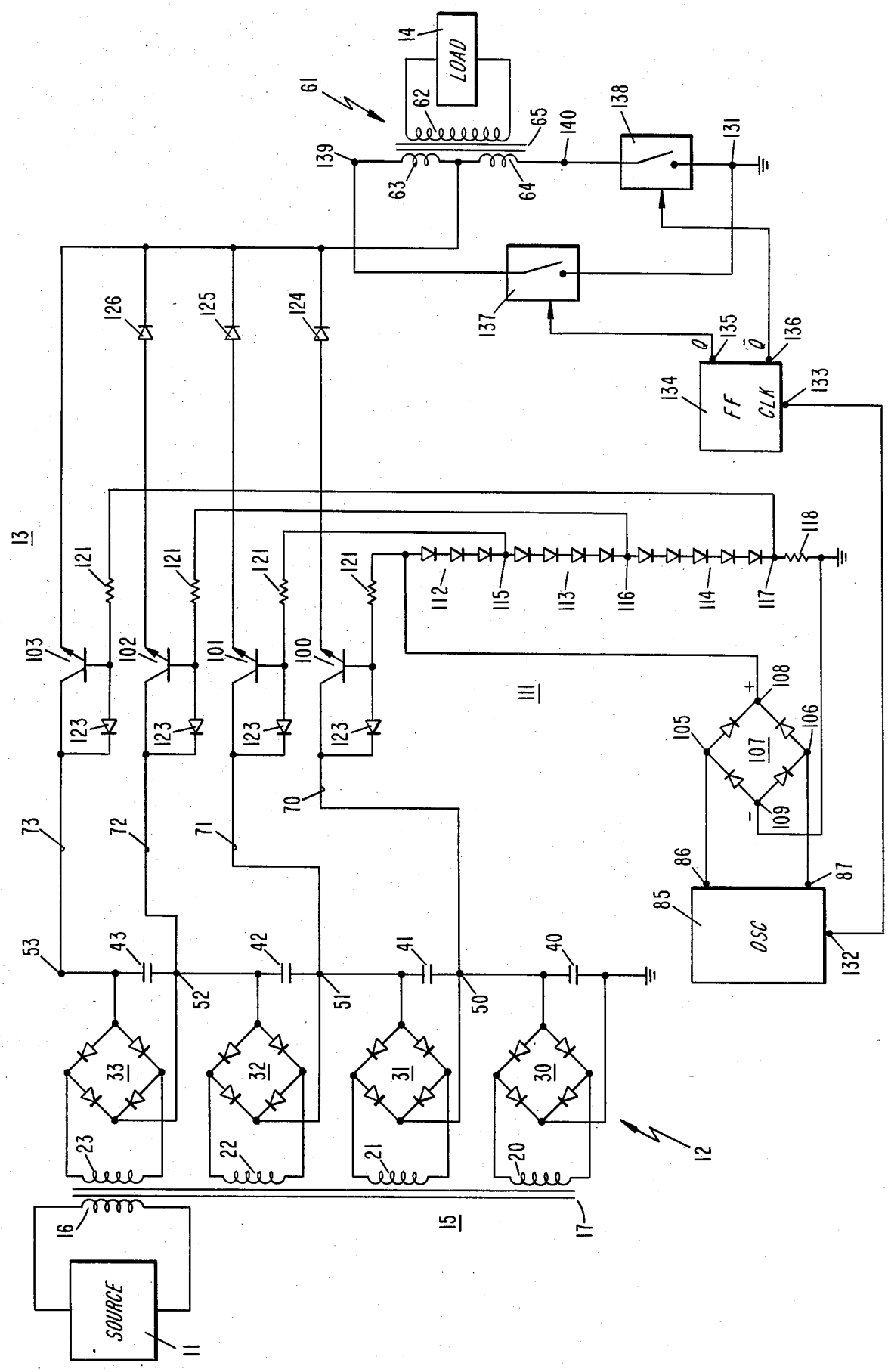

POWER CONVERTER APPARATUS AND METHOD EMPLOYING PLURAL BRANCHES

TECHNICAL FIELD

The present invention relates generally to DC to AC converters and to uninterrupted AC power supplies employing such inverters, and more particularly to a DC to AC converter apparatus and method including plural switched branches, each associated with different DC voltages; each branch while conducting feeds a gradually changing voltage to a load.

BACKGROUND ART

Many different types of DC to AC inverters have been designed and are utilized in practice. One such inverter, disclosed in U.S. Pat. No. 3,832,643, to Van Heyningen et al, employs a tapped DC power supply, with each tap being connected via a separate branch circuit to a load. Each branch circuit includes a transistor switch activated so that at any particular time only one switch couples current from one of the taps to the load. By sequentially energising the different switches the voltage impressed on the load is varied. The several branches are driven by a common signal source, having a wave shape that is reflected in the wave shape of voltage and/or current applied to a load.

In one embodiment, different switches are activated at different times in response to the signal source voltage by connecting Zener diodes having different thresholds to base control electrodes of the transistors. Each Zener diode is connected in series with a transformer winding coupled to the signal source, with the series combination being connected between the base and emitter of a separate switching transistor. In response to the signal source being in a predetermined range, only one of the transistors is activated into a conducting state. The transistor of each branch conducts between cut off and saturation.

The power dissipated by each amplifying transistor in each branch is minimized by selecting the voltage, E, applied to each branch such that at one point during one half of the quarter cycles of the control source the dissipated power in the transistor is zero. In particular, the power dissipated in the transistor of each branch is minimized by varying the applied voltage in steps during each cycle of the input signal to minimize the expression $E-IR$, where E is the voltage applied across the branch, I is the current flowing in the branch and R is the resistance of each branch, while conducting.

In a first embodiment, a different voltage E is applied to each of the different branches and the resistance R of the different branches is the same. Because of the different values of E, different currents flow through the different branches. Thus, if a control input signal has a small amplitude, a first branch conducts and applies a low voltage to the load. When the control signal has a higher value a second branch conducts and applies a second, higher voltage to the load. The first and second branches insert the same resistance between the voltage they apply to the load. The values of E and R are selected so that $E-IR$ is minimized in each branch at one instant while it is conducting.

In a second embodiment, the same voltage is applied to each branch, but the resistance and current of each branch differ while the branch is conducting. When the signal source has a small amplitude, a relatively small current flows through a first conducting branch to the load, because the branch has a relatively high impedance. In contrast, when the control input signal has a high amplitude, a large current is supplied by a second conducting branch to the load, due to the second conducting branch having a relatively low resistance. The values of I and R are chosen such that the product IR is substantially equal to the common voltage E applied to all of the branches, so that the expression $E-IR$ is substantially zero for each branch.

A possible problem with the prior art device disclosed in the Van Heyningen et al patent is that it is dependent upon the emitter collector impedance of a number of power transistors being precisely equal to each other or precisely different from each other by predetermined amounts. If the conducting emitter collector impedance of the transistor switches in the different branch circuits in the prior art circuit are not precisely determined, it is not possible to minimize $E-IR$. Another possible problem with the Van Heyningen et al circuit is obtaining Zener diodes having sufficiently precise voltage characteristics to enable the different branches to be activated into the conducting and cut off states in response to different voltages of the control signal source.

It is, accordingly, an object of the present invention to provide a new and improved high efficiency DC to AC inverter employing plural switched branches, and method of operating same.

Another object of the present invention is to provide a new and improved high efficiency DC to AC inverter having switched branches employing virtually identical transistor switching circuits.

Still another object of the present invention is to provide a new and improved high efficiency DC to AC inverter having switched branch circuits connected in a relatively simple circuit configuration, wherein the switching for each branch is determined by the amplitude of a conventional gradually varying signal source.

DISCLOSURE OF INVENTION

In accordance with one aspect of the present invention, a DC to AC converter includes N branch circuits (where N is an integer greater than one) in combination with input means connected to the DC input for coupling DC to each of the branches and output means coupled to each of the branches for deriving the AC output. Branch circuit k (where k is selectively one through N) includes variable response means responsive to a gradually changing control source so that branch circuit k is conducting to the exclusion of all other branch circuits in response to the control source amplitude being in a predetermined range. The variable response means of branch k, while conducting, responds to the control source to have an output that changes gradually between minimum and maximum voltages such that the maximum voltage for branch k is substantially equal to the minimum voltage for branch $(k+1)$.

The relative voltages for each branch and the duration that each branch conducts are such that each branch, while conducting, dissipates approximately the same amount of energy. The amount of energy dissipated by each branch is determined by the voltage and current applied to that branch, as well as the conduction duration of the branch. The voltage and current are controlled without adjusting potentiometers in the preferred embodiment, a feature which simplifies manufacturing of the converter. Typically the variable response of each branch is a variable current supplied by the conducting branch to the load, which current is dependent on the variable branch impedance that changes as the input signal value changes. The outputs from all N branches are combined.

Equalizing the dissipation in each of the branch circuits enables (1) the output to be a faithful replica of the input control source and (2) transistors of each of the branch circuits to be identical, to simplify design considerations and to provide very high reliability. As the number of branch circuits increases, there is a decrease in the total dissipation and dissipation for each branch circuit. For example, if one branch is connected to supply first and second opposite polarity voltages from a DC source to an AC load, 21.5% of the energy supplied to each branch circuit is dissipated in the branch circuit. In contrast, if eight branch circuits are connected to supply opposite polarity voltages from a DC source to an AC load, 0.5% of the energy supplied to each branch circuit is dissipated. It is noted that the efficiency of a device having one branch for supplying first and second opposite polarity voltages to a load is the same as a class B push-pull amplifier, which a one branch device closely resembles. For a sinusoidal source energy dissipation is equalized in each branch circuit by selecting the phase angle, $\theta_k$, when branch circuit k changes from a conducting to a nonconducting state and the phase angle $\theta_{k-1}$ when branch circuit k begins to conduct such that $\sin \theta_k \cos \theta_{k-1} - (\theta_k - \theta_{k-1})/2 - \frac{1}{4}(\sin 2\theta_k + \sin 2\theta_{k-1})$ is the same for each branch circuit.

In a preferred embodiment, the input means includes N series connected taps connected to the DC input for deriving N DC voltages having different absolute values. Branch circuit k is connected to tap k, maintained at a voltage equal to the maximum voltage for branch k.

The invention is particularly applicable for use as an uninterrupted AC power supply driven by an AC to DC converter. The AC to DC converter includes means for maintaining a substantially constant DC power supply voltage while the AC power source is interrupted for up to several cycles. Such means for maintaining may include extremely large, high quality capacitors or rechargeable batteries. A DC to AC converter, having the previously recited characteristics, is powered by the substantially constant DC power supply voltage derived from the AC to DC converter.

According to another aspect of the invention, a DC to AC converter includes N series connected taps at N different like polarity DC voltages different from a reference voltage, where N is an integer greater than one. N branch circuits are provided, with branch circuit k being connected to tap k, where k is selectively each of one through N. Branch circuit k includes variable response means responsive to a gradually changing control source so that branch circuit k is conducting to the exclusion of all other branch circuits in response to the control source amplitude being in a predetermined range. The variable response means of branch k, while conducting, has an output that changes gradually between the voltage at tap k and the voltage at a tap adjacent tap k in response to the gradual changes of the source. Branch circuit g includes an emitter collector path of a transistor having a control electrode coupled to the control source. The path is connected to tap g, where g is selectively every integer from one to N. The path is connected to the output of branch g by diode means for preventing output current of branch g from flowing into branches (g−1), (g−2) . . . 1. Thus the diode means of branch g cuts off branches (g−1), (g−2) . . . 1 when the amplitude of the control source is in a range for branch g to conduct. A center tapped transformer primary winding is connected to be responsive to current flowing in each branch. Switch means connects opposite first and second terminals of the winding to a reference potential at mutually exclusive times so current flows between the first terminal and the branch circuits during a first half cycle of a sinsoidal control source and current flows between the second terminal and the branch circuits during a second half cycle of the sinusoidal source. The transformer has an output winding responsive to the current flowing through the first and second terminals of the winding.

It is, accordingly, still another object of the present invention to provide a new and improved AC to DC to AC power supply which continues to supply AC to a load, in the event of a disruption of the AC power input.

The above and still further objects, features and advantage of the present invention will become apparent upon consideration of the following detailed description of one specific embodiment thereof, especially when taken in conjunction with the accompanying drawing.

BRIEF DESCRIPTION OF THE DRAWING

The single FIGURE is a circuit diagram of a preferred embodiment of an AC to DC to AC converter, operating as an uninterrupted power supply, employing the DC to AC inverter of the present invention.

BEST MODE FOR CARRYING OUT THE INVENTION

Reference is now made to the single FIGURE wherein an uninterrupted AC to DC to AC power supply is illustrated as including a 120 volt, 60 Hertz, AC source 11, rectifier 12, inverter 13, and AC load 14; load 14 is primarily resistive so that the current and voltage supplied to it have approximately the same waveshape and phase. Power from AC source 11 is coupled to rectifier 12 by transformer 15, including primary winding 16, magnetic core 17, and secondary windings 20-23. Rectifier 12 includes diode bridges 30-33, having input diagonal terminals respectively connected across secondary windings 20-23. Opposite diagonal terminals of bridges 30-33 are respectively connected to capacitors 40-43.

Load 14 is connected to inverter 13 by transformer 61 including grounded center tapped primary windings 63 and 64, connected to the output of the inverter. Transformer 61 includes magnetic core 65 and secondary winding 62 connected across load 14. To simplify the presentation, it is assumed that each of windings 62-64 includes the same number of turns, so that the magnitude of the voltage and current applied by winding 62 to load 14 is equal to the voltage and current in one of windings 63 or 64, only one of which conducts current at a time, as seen infra.

Capacitors 40-43 are high quality capacitors, having large values, so that the DC voltage developed across each of them remains relatively constant, in the event a few cycles of source 11 are interrupted. Alternatively, capacitors 40-43 can be replaced by rechargeable batteries so that a constant voltage is maintained across the output diagonals of each bridges 30-33 for a longer interruption interval of source 11.

Capacitors 40-43 are connected in series with each other, so that a negative electrode of capacitor 40 is grounded, and the positive electrode of capacitor 43, connected to terminal 53, is at a DC voltage approximately equal to the maximum voltage to be applied to AC load 14. The positive and negative electrodes of capacitors 40 and 41 are connected to common terminal 50; the positive and negative terminals of capacitors 41 and 42 are connected to common terminal 51; and the positive and negative electrodes of capacitors 42 and 43 are connected to common terminal 52.

Inverter 13 includes branches 70-73, respectively connected in DC circuits between terminals 50-53 and the center tap between windings 63 and 64. Branches 70-73 are responsive to 60 Hertz sine wave oscillator source 85, a substantial replica of which is derived across load 14. Branches 70-73 are coupled to source 85 so that only one of the branches conducts at a time. While a particular branch is conducting, it conducts in a class A manner, so that the current flowing through a particular branch and the voltage supplied by the branch to transformer 61 are replicas of the gradual variations of source 85. Branches 70-73 conduct sequentially during each quarter cycle of oscillator 85. To reduce the size of core 65 of transformer 61, it is possible to chop the current flowing in each of branches 70-73 at a relatively high frequency, such as 20 kiloHertz. The energy dissipated in each of branches 70-73 during each quarter cycle of oscillator 85 is substantially the same, a result achieved by judicious selection of the relative voltage across each of capacitors 40-43 and the conducting interval of each of branches 70-73 during each quarter cycle of oscillator 85.

To achieve the stated results, source 85 includes complementary output terminals 86 and 87, on which are derived 60 Hertz sine waves that are phased displaced from each other by 180°. To provide uninterrupted power to load 14, in the event of a failure of source 11, source 85 is a low power source, preferably powered by a battery which is charged in response to source 11 by a rectifier similar to one of rectifiers 31-33.

Branches 70-73 respectively include NPN power transistors 100-103. During a positive going, positive first quarter cycle of source 85 transistor 100 conducts in class A with a waveform that is a replica of a first segment of the positive going voltage at terminal 86 as the voltage of source 85 varies between zero and a first predetermined positive level; transistor 101 conducts in class A with a waveform that is a replica of a second segment of the positive going voltage at terminal 86 as the positive voltage at terminal 86 varies between the first and a second predetermined level; transistor 102 conducts in class A with a waveform that is a replica of a third segment of the positive going voltage at terminal 86 as the positive voltage at terminal 86 varies between the second predetermined level and a third predetermined level; and transistor 103 conducts in class A with a waveform that is a replica of a fourth segment of the positive going voltage at terminal 86 when the positive voltage at terminal 86 is between the third and a fourth level. During the negative going, positive second quarter cycle of source 85, transistors 100-103 successively conduct in the opposite sequence for the same periods with oppositely going waveforms relative to the first quarter cycle. During the negative going, negative third quarter cycle and the positive going, negative fourth quarter cycle of source 85, transistors 100-103 conduct in exactly the same manner as during the first and second quarter cycles, respectively. During each quarter cycle of source 85, transistors 100 and 103 conduct for approximately the same interval, which is greater than the common conducting interval of transistors 101 and 102.

The number of turns of windings 20-23 is arranged so that the greatest voltage is developed across capacitor 40, the next greatest voltage is developed across capacitor 41, an intermediate voltage is developed across capacitor 42, and the smallest voltage is developed across capacitor 43. Because capacitors 40-43 are connected in a series stacked circuit, the greatest voltage is applied to branch 73, the next greatest voltage is applied to branches 72, an intermediate voltage is applied to branch 71, and the smallest voltage is applied to branch 70.

The stated selection of the conducting intervals for branches 70-73 and of the voltages applied to capacitors 40-43 is necessary to achieve equal energy dissipation in transistors 100-103 during each cycle of sine wave source 85. It is to be understood, however, that if source 85 derives a wave other than a sine wave, a different relationship subsists between the conducting times of branches 70-73 and the voltages across capacitors 40-43.

To enable only one of branches 70-73 to conduct in a class A manner at a particular time, the emitter collector paths of transistors 100-103 are series connected between terminals 50-53 and the center tap between windings 63 and 64. The bases of transistors 101-103 are driven by a full wave rectified replica of the sinusoidal output of oscillator 85 between terminals 86 and 87 so that during each quarter cycle of the wave between terminals 86 and 87 transistors 100-103 conduct at different times. To these ends, the voltage across terminals 86 and 87 is applied to input terminals 105 and 106 of full wave rectifying bridge 107, having output terminals 108 and 109, across which is developed a positive full wave rectified replica of the sinusoidal voltage derived by oscillator 85.

The voltage developed across terminals 108 and 109 is applied across circuit 111, including a string of series diodes. The diodes in circuit 111 are arranged in three networks 112, 113 and 114, with tap 115 being between networks 112 and 113 and tap 116 being between networks 113 and 114. Tap 117 is provided between network 114 and resistor 118, in turn connected to ground and terminal 109 of bridge 107. The diodes in networks 112-114 are arranged so that terminals 115, 116 and 117 become forward biased at progressively higher voltages of oscillator 85, i.e., between terminals 108 and 109. In the preferred, illustrated embodiment, networks 112, 113 and 114 respectively include three series connected diodes, four series diodes and five series connected diodes. Each of the diodes in networks 112-114 is of the conventional silicon type, whereby when the diode is forward biased a 0.7 volt drop subsists across it. For the four stage illustrated device the maximum amplitude of oscillator 85 is designed such that during the first one-quarter cycle swing thereof, the voltage between terminals 108 and 117 varies from 0 volts to 8.4 volts.

The voltages at terminals 108, 115, 116 and 117 are respectively applied to the bases of transistors 101, 102 and 103 by way of current coupling resistors 121. The voltages applied to the bases of transistors 100-103 control when transistors 100-103 become forward biased, virtually independently of the voltages applied to the collectors of transistors 100-103 by terminals 50-53. To cut off transistors 100-103 so that only one of them conducts at a time, the emitters of transistors 100-102 are connected to the center tap between windings 63 and 64 by diodes 124, 125 and 126, respectively. The emitter of transistor 103 is directly connected to the center tap between windings 63 and 64.

Diodes 124–126 prevent current from a higher numbered branch from flowing into a lower numbered branch. For example, when transistor 102 of branch 72 is forward biased, current flows through diode 126 to the center tap between windings 63 and 64 but is prevented from flowing into branches 70 and 71 by diodes 24 and 25, respectively, so branch 72 conducts to the exclusion of branches 70 and 71. Because the highest potential is applied to branch 73 by terminal 53, there is no possibility of reverse current flowing in branch 73, whereby there is no need for a diode between the emitter of transistor 103 and the center tap between windings 63 and 64.

To protect transistors 100–103 from excessive currents, the base collector junction of each of the transistors is shunted by a separate diode 123, each having an anode and cathode respectively connected to the corresponding transistor base and collector. Diodes 123 are back biased during normal operation and do not affect operation of the circuit except when the transistor 100–103 associated with a particular diode is subject to destructive current.

In the illustrated embodiment, all of transistors 100–103 have similar characteristics so that each is forward biased in response to the base emitter junction voltage thereof being +0.7 volts. Also, diodes 123–126 have identical characteristics, with each being forward biased in response to +0.7 volts subsisting across it. It is to be understood that if bipolar transistors have different bias characteristics or if they are replaced by other switching devices, such as field effect transistors, the forward bias applied to the switching devices are accordingly changed. It has also been found that the switching transistors do not need to be matched but that transistors of the same type suffice.

The illustrated circuit for controlling forward biasing of transistors 100–103 could be replaced by Zener diodes shunting the bases of transistors 100–103 to ground. The disadvantage of such Zener diodes, however, is that variations in the voltages developed across capacitors 40–43 are not likely to be compensated by the Zener diodes. In contrast, in the specifically illustrated embodiment, conduction of transistors 100–103 is, to a large extent, independent of the absolute amplitudes of the voltages across capacitors 40–43, but is only a function of the relative amplitudes of these voltages. In tests that have actually been conducted, it has been found that substantially equal dissipation occurs in transistors 100–103 for variations of almost 100% in the voltages applied by source 11 to transformer 16, i.e., equal dissipation occurs in transistors 100–103 for peak to peak voltages of source 11 in the range from 0 to 340 volts; such a 340 peak to peak voltage results in terminal 53 being at a voltage of +170 volts which is converted by the present invention into a 120 volt rms output, assuming a turns ratio of 1:1 between windings 62 and 63, as well as windings 62 and 64.

In operation, during a first interval of a first positive quarter cycle of source 85 when the voltage at terminal 86 is positive, between zero and a first predetermined positive level, the base of transistor 100 is forward biased to the exclusion of the bases of transistors 101–103. Thereby, the current flowing through the emitter collector path of transistor 100 to the center tap of transformer 61 is a replica of the voltage at terminal 86 during this first interval. Thereby, during the first interval the voltage at the center tap increases gradually from zero to a peak value equal to the voltage at terminal 50 minus the drops across the emitter collector path of transistor 100 and diode 124. During the first interval, transistors 101–103 remain cut off in response to the diodes of networks 112–114 being back biased so that the voltages at terminals 115–117 are substantially at ground potential, causing back biasing of the bases of transistors 101–103.

In response to the voltage at terminal 86 being sufficient to cause the voltage at terminal 108 to reach the first predetermined value, the three diodes of network 112 are forward biased during a second interval. In response to the three diodes of network 112 being forward biased, the voltage at terminal 115 suddenly increases to a value sufficient to forward bias the base emitter collector junction of transistor 101. Transistor 101 thereby begins to conduct in class A fashion in response to the sinusoidal variation at terminal 108. Thereby, during the second interval the voltage at the center tap of transformer 61 gradually increases from the voltage at the center tap at the end of the first interval to the voltage at terminal 51 minus the drop across the emitter collector of transistor 101 and diode 125. During the second interval, transistor 101 conducts to the exclusion of transistors 100, 102 and 103. Transistor 100 is cut off because the voltage at the center tap of transformer 61 is now at a higher level which back biases diode 124, to cut off current flow through transistor 100.

Transistor 101 continues to conduct until the voltage of source 85 reaches a second predetermined voltage, at which time transistor 102 is forward biased in response to the voltage at terminal 108 being sufficiently great to forward bias the four diodes in network 113. While the base emitter junction of transistor 102 is forward biased during a third conducting interval, transistor 102 is operated in class A fashion so that the current flowing through it is a replica of the segment of the sinusoidal wave developed at terminal 108 during the interval while transistor 102 is conducting. Thereby, during the third interval the voltage at the center tap of transformer 61 increases gradually from approximately the voltage at tap 51 to approximately the voltage at tap 52, to back bias diodes 124 and 125, to cause cut off of branches 70 and 71. Transistor 102 continues to conduct in class A manner until the third predetermined level is reached, at which time the base emitter junction of transistor 103 is forward biased in response to the voltage at terminal 108 being sufficiently great to cause the five diodes in network 114 to be forward biased. The voltage at tap 53 coupled by transistor 103 to the center tap of transformer 61 back biases diodes 124–126 and branches 70–72. Transistor 103 remains forward biased during the remainder of the first quarter cycle of oscillator 85 and continues to be forward biased until the voltage derived from oscillator 85 during the second quarter cycle drops to a level such that the diodes in network 114 are cut off during the next quarter cycle. Cut off of the diodes in network 114 occurs at an angle during the second quarter cycle that is displaced from 90° by the same amount as when the diodes began to conduct during the first quarter cycle.

Transistor 103 now becomes back biased and the voltage at the center tap of transformer 61 drops, enabling branches 70–72 to be forward biased in response to voltages at taps 115 and 116. As time continues and the output voltage of oscillator 85 decreases during the second quarter cycle, a positive forward bias is applied to the base of transistor 102 by the voltage at terminal 116, by virtue of the diodes in networks 112 and 113 being forward biased. Thereby, current flows, in class A fashion, through the emitter collector path of transistor 102 from terminal 52 to the center tap of transformer 61. Current continues to flow through transistor 102 until the voltage of oscillator 85 has decreased during the second half cycle by an amount sufficient to cut off the diodes in network 113. This cuts off transistor 102 so that transistor 101 can be forward biased. Simultaneously with cut off of transistor 102, transistor 101 is forward biased in response to the voltage at tap 115. Thereby, transistor 101 conducts in class A fashion in response to the voltage at terminal 115. When the voltage at terminal 108 has dropped sufficiently, the diodes of network 112 cut off and forward bias is removed from the base emitter junction of transistor 101, causing cut off of transistor 101. Simultaneously with cut off of transistor 101, transistor 100 is forward biased in response to the sinusoidal variation at terminal 108, causing transistor 100 to operate in class A fashion to feed current to the center tap of transformer 61.

Transistor 100 continues to conduct even after the voltage of oscillator 85 has gone through a zero value by virtue of the connections of terminals 86 and 87 of the oscillator to terminals 105 and 106 of rectifier bridge 107. Because the voltage between terminals 108 and 109 has the same shape and polarity during the negative half cycle of oscillator 85 as subsists between these terminals during a positive half cycle of the oscillator, the diodes of network 111 and transistors 100-103 function in the same manner as described for a positive half cycle of the oscillator.

To provide opposite polarity current flow to load 14 during opposite polarity half cycles of oscillator 85, terminals 139 and 140 of transformers 63 and 64 are connected at mutually exclusive times to ground terminal 131, during opposite half cycles of oscillator 85. To this end, oscillator 85 includes a zero cross-over detector, which derives a pulse once each half cycle of the oscillator, in synchronism with a polarity transition of the sinusoidal variation applied by the oscillator to terminals 86 and 87. The zero cross-over pulse is supplied by oscillator 85 to output terminal 132 thereof, which output terminal is connected to clock input terminal 133 of flip-flop 134. Flip-flop 134 includes complementary Q and $\overline{Q}$ output terminals 135 and 136 on which are derived square waves having positive values during the half cycles of oscillator 85 when the oscillator supplies positive and negative voltages to terminal 86, respectively.

The complementary square wave voltages at terminals 135 and 136 are supplied as control inputs to switches 137 and 138, respectively. Switches 137 and 138 are closed at mutually exclusive times in response to the signals at terminals 135 and 136 so that switch 137 is closed during each positive half cycle of the voltage at terminal 86, while switch 138 is closed during each negative half cycle of the voltage at terminal 86. Switches 137 and 138 are connected between ground and opposite terminals 139 and 140 of windings 63 and 64. Thereby, during each positive half cycle of the voltage at terminal 86, a current path subsists from the center tap of transformer 61 through winding 63 to ground terminal 131 via switch 137; during each negative half cycle of the voltage at terminal 86, a current path subsists between the center tap of transformer 61 and winding 64 to ground terminal 131 by way of switch 138. Thereby, opposite polarity currents flow in windings 63 and 64 during positive and negative half cycles of oscillator 85, to provide bipolarity voltage and current to load 14.

The circuit operates in the stated manner for successive half cycles of oscillator 85. To provide equal dissipation in transistors 100-103 for sinusoidal oscillator 85, the cut off phase angles of transistors 100-103 are selected such that the quantity $$\sin\theta_k \cos\theta_{k-1} - (\theta_k - \theta_{k-1})/2 - \tfrac{1}{4}(\sin 2\theta_k + \sin 2\theta_{k-1}) \quad (1)$$

is the same for each of branches 70-73, $\theta_k$ = the angle of oscillator 85 that the transistor of branch k cuts off during a first, positive going quarter cycle of oscillator 85, $\theta_{k-1}$ = angle of oscillator 85 that the transistor of branch k begins to conduct during the first quarter cycle, and k is selectively each of the branches containing transistors 100, 101, 102 and 103.

The relative values of the voltages $E_{k'} = (E_k/E \text{ max})$ at terminals 50-53 are determined after the phase angles indicated by Equation 1 have been determined for the individual branches and by substituting the determined phase angle value into:

$$E_{k'} = \sin\theta_k,$$

where:

$E_k$ = actual voltages at the taps connected to transistors k, and

E max = actual voltage at tap 53.

For the exemplary branch circuit illustrated in the FIGURE, the relative amplitudes of the voltages at taps 50, 51, 52 and 53 are related to the cut off angles, $\theta_k$, of transistors 100, 101, 102 and 103 during a first positive going, positive quarter cycle of oscillator 85 in accordance with:

TABLE I

|  | Branch 70<br>k = 1 | Branch 71<br>k = 2 | Branch 72<br>k = 3 | Branch 73<br>k = 4 |
|---|---|---|---|---|
| $\theta_k$ | 28.3° | 45.0° | 61.8° | 90° |
|  | $\left(\dfrac{\text{E at tap 50}}{\text{E at tap 53}}\right)$ | $\left(\dfrac{\text{E at tap 51}}{\text{E at tap 53}}\right)$ | $\left(\dfrac{\text{E at tap 52}}{\text{E at tap 53}}\right)$ | $\left(\dfrac{\text{E at tap 53}}{\text{E at tap 53}}\right)$ |
| $\dfrac{E_k}{E \text{ max}}$ | 0.4729 | 0.7071 | 0.8817 | 1.0 | tively.

From Table I, during the first quarter cycle of source 85, branch 70 conducts from 0° to 28.3°; branch 71 conducts from 28.3° to 45.0°; branch 72 conducts from 45° to 61.8° and branch 73 conducts from 61.8° to 90°. During the second quarter cycle of source 85, branch 73 remains conducting from 90° to 118.2°; branch 72 conducts from 118.2° to 135°; branch 71 conducts from 135° to 151.7° and branch 70 conducts from 151.7° to 180°. Similar conduction intervals occur during the third and fourth quarter cycles.

The four branch circuit of the FIGURE provides an overall calculated efficiency of 92.69%, resulting in a calculated loss per stage of 1.83% of the energy coupled by source 11 to winding 16. To provide increased efficiency, the number of parallel branches is increased. For eight branches, the overall calculated efficiency of the network is 96.03%, and the caulculated loss for each branch is slightly less than 0.50%. For the eight branch configuration, the relative voltages applied to the branches and the phase angle at which series switches of the branches are rendered conductive are indicated by:

TABLE II

| | k = 1 | k = 2 | k = 3 | k = 4 | k = 5 | k = 6 | k = 7 | k = 8 |
|---|---|---|---|---|---|---|---|---|
| $\theta_k$ | 18.0 | 28.0 | 36.7 | 45.0 | 53.3 | 62.1 | 72.0 | 90.0 |
| $\frac{E_k}{E\,max}$ | 0.3088 | 0.4682 | 0.5965 | 0.7071 | 0.8018 | 0.8841 | 0.9512 | 1.0 |

While there has been described and illustrated one specific embodiment of the invention, it will be clear that variations in the details of the embodiment specifically illustrated and described may be made without departing from the true spirit and scope of the invention as defined in the appended claims. For example, the center tap drive, with a single diode in the emitter paths of transistors 100–102, can be replaced by driving each of terminals 139 and 140 with N parallel sequentially activated networks. The N networks driving terminal 139 are activated during each positive half cycle of oscillator 85, while the N circuits driving terminal 140 are activated during each negative half cycle of oscillator 85. In such a configuration, the center tap of transformer 61 is grounded and the bases of the N transistors connected to terminals 139 and 140 are respectively forward biased during the first and second half cycles of oscillator 85. Also, the series circuit 111 can be eliminated and the transistor bases driven directly by the output of oscillator 85. In such an instance, difference numbers of series diodes are connected to the emitters of transistors 100–103 to enable different transistors 100–103 to be conductive at different times. For example, one diode, poled in the same direction as diode 124, is connected to the emitter of transistor 100, two diodes are connected in series with the emitter of transistor 101, three diodes are connected in series with the emitter of transistor 102, and four diodes are connected in series with the emitter of transistor 103. In certain uninterrupted AC power supply situations it may be desirable to connect load 14 to source 11 so the illustrated converter is selectively bypassed and connected in series between the source and load by a switching arrangement. In such a situation, oscillator 85 is locked to the frequency and phase of source 11 so that abrupt phase shifts in the load current and voltage do not occur when the converter is connected and disconnected between the source and load.

I claim:

1. A converter wherein a DC input is converted to AC in response to a gradually changing sinusoidal control source comprising N branch circuits, where N is an integer greater than one, input means connected to the DC input for coupling DC to each of the branch circuits, output means coupled to each of the branch circuits for deriving the AC output, branch circuit k being connected between the input and output means, where k is selectively one through N, branch circuit k including variable response means responsive to the control source so that branch circuit k is conducting to the exclusion of all other branch circuits in response to the control source amplitude being in a predetermined range, the variable response means of branch circuit k, while conducting, responding to the control source to have an output with a gradually changing envelope, branch circuit k being connected to the input and output means so the envelope changes between a minimum voltage for branch circuit k to a maximum voltage for branch circuit k and the source being arranged so that each branch circuit while conducting responds to the gradual changes of the source to dissipate the same amount of energy, the minimum voltage for branch circuit (k+1) being approximately equal to the maximum voltage for branch circuit k, the output means including means for combining the outputs from the N branch circuits, and means for coupling the sinusoidal source to branch circuit k to cause the phase angle, $\theta_k$, when branch circuit k changes from a conducting to a non-conducting state, and the phase angle $\theta_{k-1}$, when branch circuit k begins to conduct, to be such that sin $\theta_k$ cos $\theta_{k-1} - (\theta_k - \theta_{k-1})/2 - \frac{1}{4}(\sin 2\theta_k + \sin 2\theta_{k-1})$ is the same for each branch circuit.

2. An uninterrupted AC power supply powered by an AC source subject to being interrupted comprising an AC to DC converter including means for maintaining a substantially constant DC power supply voltage while the AC power source is interrupted for up to several cycles, a DC to AC converter powered by the substantially constant DC power supply voltage of the AC to DC converter, said DC to AC converter including: a gradually changing sinusoidal cyclic control source, N branch circuits, where N is an integer greater than one, input means connected to respond to the substantially constant DC power supply voltage, output means coupled to each of the branches for deriving the AC output, branch circuit k being connected between the input and output means, where k is selectively one through N, branch circuit k including variable response means, means responsive to the control source and coupled to the variable response means of branch circuit k for controlling the conduction time of branch circuit k so branch circuit k is conducting to the exclusion of all other branch circuits in response to the control source amplitude being in a predetermined range, means for controlling the variable response means of branch circuit k so that branch circuit k while conducting has an output with a gradually changing envelope between a minimum voltage for branch circuit k to a miximum voltage for branch circuit k in response to the gradual changes of the source and connections of branch circuit k to the input means and output means, the minimum voltage for branch circuit (k+1) being approximately equal to the maximum voltage for branch circuit k, the output means including means for combining the outputs from the N branches, the conduction time controlling means and the variable response controlling means controlling the conducting duration for branch circuit k and the miminum and maximum voltages for branch circuit k such that each of said N branches has substantially the same energy dissipation during each cycle of the control source, and means for coupling the sinusoidal source to branch circuit k to cause the phase angle, $\theta_k$, when branch circuit k changes from a conducting to a non-conducting state, and the phase angle $\theta_{k-1}$, when branch circuit k begins to conduct, to be such that sin $\theta_k$ cos $\theta_{k-1} - (\theta_k - \theta_{k-1})/2 - \frac{1}{4}(\sin 2\theta_k + \sin 2\theta_{k-1})$ is the same for each branch circuit.

3. A method of converting DC to AC with a circuit including N DC voltages having different absolute values, where N is an integer greater than one, N branch circuits, branch circuit k being connected between a DC input and an output means for deriving the AC output, where K is selectively one through N, branch circuit k including variable response means, the method comprising sequentially activating the different branch circuits so branch circuit k is activated to a conducting state to the exclusion of all other branch circuits, branch circuit k when activated supplying current and voltage with a gradually changing envelope to the AC output, the envelope associated with each branch being a portion of a predetermined gradually sinusoidal waveform, the parameters of the circuit and the conducting interval of the branches being such that each branch circuit dissipates approximately the same energy, the phase angle, $\theta_k$ when branch circuit k changes from a conducting to a non-conducting state, and the phase angle $\theta_{k-1}$ when branch circuit k begins to conduct are such that sin $\theta_k$ cos $\theta_{k-1} - (\theta_k - \theta_{k-1})/2 - \frac{1}{4}(\sin 2\theta_k + \sin 2\theta_{k-1})$ is the same for each branch circuit.

4. A converter wherein DC is converted to AC in response to a gradually changing control source, comprising N series connected taps at N DC voltages continuously having different absolute values, where N is an integer greater than one, N branch circuits, branch circuit k being connected to tap k, where k is selectively one through N, branch circuit k including variable response means responsive to the control source so that branch circuit k is conducting to the exclusion of all other branch circuits in response to the control source amplitude being in a predetermined range, the variable response means of branch circuit k while conducting having an output with a gradually changing envelope between the voltage at tap k and the voltage at a tap adjacent tap k in response to the gradual changes of the source, the variable response means of branch circuit g including an emitter collector path of a transistor having a control electrode coupled to the control source, one electrode of the path of branch circuit g being connected to tap g, where g is selectively every integer from one to N, another of the electrodes of the path of branch circuit g being connected to the output of branch circuit g via diode means for preventing output current from another branch circuit from flowing to branch circuit g when the amplitude of the control source is above the range for branch circuit h to conduct, where h is selectively every integer from 1 to (N−1), a diode chain connected to the control source to respond to voltage variations that are replicas of variations of the control source, said chain including N terminals, terminal m being connected to the control electrode of the transistor for branch circuit m, where m is selectively every integer from 1 to N, the number of diodes between each adjacent pair of said terminals being different, and means for coupling the current flowing through the conducting branch to a load.

5. A converter wherein DC is converted to AC in response to a gradually changing control source having first and second opposite polarity ampltiude variations about an average value, comprising N series connected taps at N DC voltages continuously having different absolute values, where N is an integer greater than one, N branch circuits, branch circuit k being connected to tap k, where k is selectively one through N, branch circuit k including variable response means responsive to the control source so that branch circuit k is conducting to the exclusion of all other branch circuits in response to the control source amplitude being in a predetermined range, the variable response means of branch circuit k while conducting having an output with a gradually changing envelope between the voltage at tap k and the voltage at a tap adjacent tap k in response to the gradual changes of the source, the variable response means of branch circuit g including an emitter collector path of a transistor having a control electrode coupled to the control source, one electrode of the path of branch circuit g being connected to tap g, where g is selectively every integer from one to N, another of the electrodes of the path of branch circuit g being connected to the output of branch circuit g via diode means for preventing output current from another branch circuit from flowing to branch circuit g when the amplitude of the control source is above the range for branch circuit h to conduct, where h is selectively every integer from 1 to (N−1), a transformer having a winding with a center tap connected to be responsive to current flowing in each branch, switch means for connecting opposite first and second terminals of the winding to a reference potential at mutually exclusive times so current flows via the center tap between the first terminal and the branch circuits during the first polarity variation and current flows via the center tap between the second terminal and the branch circuits during the second polarity variation, the transformer having an output winding responsive to the current flowing through the first and second terminals of the winding, and means responsive to the control source for full wave rectifying the opposite polarity variations to derive unidirectional variations that are replicas of the opposite polarity variations, a diode chain connected to respond to the derived unidirectional variations, said chain including N terminals, terminal m being connected to the control electrode of the transistor for branch circuit m, where m is selectively every integer from 1 to N, the number of diodes between each adjacent pair of said terminals being different.

* * * * *